May 20, 1952  H. J. STRAHM  2,597,760
IRRIGATION PIPE CARRYING DEVICE
Filed June 21, 1950
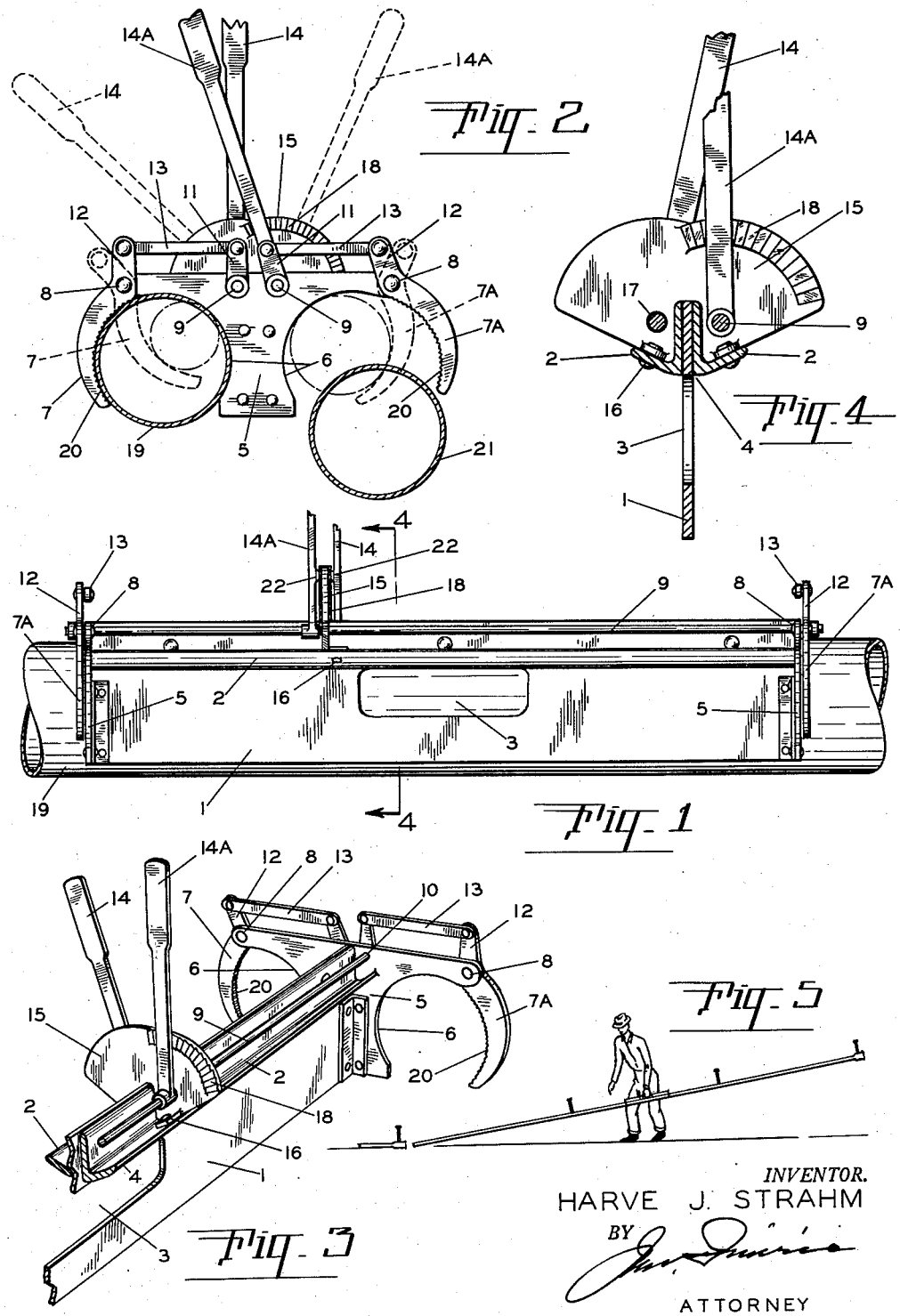
INVENTOR.
HARVE J. STRAHM
BY
ATTORNEY Patented May 20, 1952

2,597,760

UNITED STATES PATENT OFFICE 2,597,760

IRRIGATION PIPE CARRYING DEVICE

Harve J. Strahm, Medford, Oreg.

Application June 21, 1950, Serial No. 169,400

2 Claims. (Cl. 294—16)

1

This invention relates to a pipe carrying device and is particularly adapted in the handling of irrigation pipes.

The primary object of the invention is to provide a device for carrying irrigation pipes that will prevent the pipes from rotating due to the weight of the risers associated with the pipes while moving them from place to place.

In the handling of irrigation pipe by hand, it is difficult to hold them from turning in the hands due to the fact that they are wet and slippery, but with my new and improved carrying device, they are securely gripped from two points on the pipe which balances the pipe while being carried by my new and improved carrying device.

Another object of my invention is to be able to carry one or two pipes at one time.

A still further object of my invention is to provide a carrying device that will carry various sizes of pipe.

These and other incidental objects will be apparent in the drawings, specification and claims.

Referring to the drawings:

Figure 1 is a side view of my new and improved pipe carrying device.

Figure 2 is an end view of the device, illustrating a large pipe being held thereby and showing how said pipe is released. Dotted positions show the position of the clamping jaws for various sized pipes.

Figure 3 is a fragmentary sectional perspective view of my pipe carrying device removed from the pipe.

Figure 4 is an enlarged fragmentary detail sectional view of the operating levers and quadrants associated therewith for operating the clamping jaws.

Figure 5 illustrates how the pipes are carried by my new and improved carrying device.

Referring more specifically to the drawings:

My new and improved pipe carrying device consists of a main central longitudinal frame 1. This frame is reenforced by the angle bars 2 and cut out at 3 so that the operator can insert his hand therethrough in the carrying operation. The angle bars 2 provide a hand grip as well as a stiffener as indicated at 4.

End plates 5 are fixedly secured to the ends of the frame 1 and to the ends of the angles 2 by any suitable means, as for instance welding, or angles 5' riveted or welded thereto. The end plates 5 are cut out at 6 to embrace the largest pipe being carried, as for instance the pipes 19 and 21 illustrated in Figure 2 in full lines.

Pipe clamping jaws 7 and 7A are pivotally mounted to the end frames 5 at 8 and are operated in the following manner. Shafts or rods 9 run longitudinally of the device on opposite sides of frame bar 1 and angle bars 2 and are journalled within the end plates 5 at 10. Cranks 11 are fixedly secured to the ends of the rods 9 by any suitable means, as for instance keys or by welding.

The jaws 7 and 7A have arms 12 extending beyond their center point 8 and are adapted to be connected to the cranks 11 by the connecting links 13. Operating levers 14 and 14A are keyed or otherwise affixed to the shafts 9 and lie adjacent the double quadrant 15, which is fixedly secured to the center frame 1 and the angles 2 by any suitable means, as for instance rivets or bolts 16. The shafts 9 are also journalled within the quadrant best illustrated in Figure 4 at 17.

I will now describe the operation of my new and improved pipe carrying device. The device is set on to the pipe as illustrated in Figure 1. The levers 14 and 14A are brought against the ratchet teeth 18 of the quadrant 15 tightening the movable jaws 7 and 7A against the side of the pipes forcing the same pipes into the cut away portion 6 of the plate 5. The jaws on both ends of the device are operated at one time by the levers 14 and 14A.

In Figure 2 I illustrate the lever 14 holding the jaw 7 against the pipe 19; the said jaws 7 and 7A have teeth 20 for engaging the pipes preventing them from rotating. I illustrate the lever 14A releasing the jaw 7A from the pipe 21 in Figure 2. Pawls 22 form part of the levers 14 and 14A and engage the teeth 18 of the quadrant 15 by the tension created in the levers between the shaft 9 and 17 and the quadrant teeth 18 so that the levers will stay at any fixed position until the operator pulls the levers away from the teeth releasing the same.

In Figure 2 I illustrate the lever 14 in dotted position together with the jaw 7 for holding a small pipe while the lever 14A is in dotted position together with the jaw 7A for holding a pipe of larger size, illustrating that my carrying device is readily adapted to any size pipe.

In the operation of my new and improved pipe carrying device, one pipe can be carried as conveniently as two or vice versa, the weight of the pipe coming to a balance in regards to the operator carrying the carrying device in either event.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. A pipe carrying device comprising an elongated frame in sheet form, angle bars extending longitudinally of the frame and secured to one longitudinal edge of the frame on opposite sides of the frame, transversely extending end pieces, angle members securing said end pieces to the opposite sides of said frame in abutting relation to said ends and said angle bars, said end pieces having inwardly extending arcuate shaped cutouts in the opposite ends thereof, curved jaws pivotally secured to the opposite ends of said end pieces above said cutouts, said cutouts and said jaws being curved in reverse relation to each other to receive and grip pipes to be carried, operating rods extending longitudinally of said elongated frame within said angle bars, said rods being pivotally mounted at their opposite ends within said end pieces, cranks fixedly connected to the outer ends of said operating rods, arms on said jaws beyond their pivotal connection with said end pieces, links pivotally connected at their opposite ends to said crank and said arms, upstanding operating levers fixedly secured to said rods, a double quadrant straddling said frame secured to said angle bars with said operating rods passing through said quadrant, spaced teeth on the outer edge of each quadrant and a pawl on each operating lever adapted to engage the teeth on each quadrant to prevent said rods from rotating.

2. A pipe carrying device comprising a central longitudinal frame, cross members on the frame having pipe receiving recesses, jaws movably carried by the cross members to clamp pipes in the recesses, means carried by the frame and operatively connected to the jaws to move and hold the latter in clamping position, said means comprising rods extending along the frame and mounted to turn in the cross members, articulated connections between the rods and jaws, and adjustable throw levers mounted on the rods and frame to turn the rods and move the jaws to clamping and releasing position with respect to pipe in the recesses, said frame having an opening intermediate its ends to form a hand grip, and said frame comprising a central longitudinal dividing bar anchored to the cross members, angle bars on opposite sides of the dividing bar anchored thereto and the cross members, gripping means for the frame, and said gripping means comprises arms fixed on the jaws and rods, links connecting said arms, to turn the rods and swing the jaws to clamping and releasing positions and notched quadrants on the frame cooperating with pawls on the levers to hold the jaws in clamping positions under pipes against the cross members at the recesses.

HARVE J. STRAHM.

REFERENCES CITED

The following references are of record in the file of this patent:

UNITED STATES PATENTS

| Number | Name | Date |
|---|---|---|
| 1,717,194 | Daoust | June 11, 1929 |
| 1,781,875 | Hopkins | Nov. 18, 1930 |
| 2,078,848 | Greger | Apr. 27, 1937 |